US010663978B2

(12) United States Patent
Tatara et al.

(10) Patent No.: US 10,663,978 B2
(45) Date of Patent: May 26, 2020

(54) VEHICLE ILLUMINATION DEVICE, VEHICLE AND ILLUMINATION CONTROL SYSTEM

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/064,622

(22) PCT Filed: Dec. 21, 2016

(86) PCT No.: PCT/JP2016/088228
§ 371 (c)(1),
(2) Date: Jun. 21, 2018

(87) PCT Pub. No.: WO2017/110936
PCT Pub. Date: Jun. 29, 2017

(65) Prior Publication Data
US 2019/0011930 A1   Jan. 10, 2019

(30) Foreign Application Priority Data

Dec. 22, 2015   (JP) .................................. 2015-249882

(51) Int. Cl.
*G05D 1/02* (2020.01)
*B60Q 1/50* (2006.01)
(Continued)

(52) U.S. Cl.
CPC ............. *G05D 1/0289* (2013.01); *B60Q 1/00* (2013.01); *B60Q 1/50* (2013.01); *B60W 30/00* (2013.01);
(Continued)

(58) Field of Classification Search
CPC ...... B60Q 1/50; G05D 1/0289; G05D 1/0088; G08D 1/0276; G08G 1/09; G08G 1/163; G08G 1/166
(Continued)

(56) References Cited

U.S. PATENT DOCUMENTS 3,787,867 A * 1/1974 Dodge ....................... G01S 1/70
                                                         340/12.5
3,846,672 A * 11/1974 Doughty ................ H05B 41/44
                                                         174/112
(Continued)

FOREIGN PATENT DOCUMENTS

JP          09277887 A     10/1997
JP       2000293799 A     10/2000
(Continued)

OTHER PUBLICATIONS

International Search Report (PCT/ISA/210), issued by International Searching Authority in corresponding International Application No. PCT/JP2016/088228, dated Mar. 21, 2017.
(Continued)

*Primary Examiner* — Ojiako K Nwugo
(74) *Attorney, Agent, or Firm* — Sughrue Mion, PLLC

(57) ABSTRACT

An illumination device provided in a vehicle capable of traveling in an automatic driving mode is provided with: an illumination unit configured so that light is emitted toward the outside of the vehicle; and an illumination control unit configured so that, on the basis of an illumination control signal transmitted from another vehicle capable of traveling in an automatic driving mode and provided with an illumination unit, the illumination state of the illumination unit corresponds to the illumination state of the illumination unit.

8 Claims, 7 Drawing Sheets

(51) Int. Cl.
  *G08G 1/09* (2006.01)
  *B60Q 1/00* (2006.01)
  *B60W 30/00* (2006.01)
  *G08G 1/16* (2006.01)
  *G08G 1/00* (2006.01)
  *G05D 1/00* (2006.01)

(52) U.S. Cl.
  CPC ......... *G05D 1/0088* (2013.01); *G05D 1/0276* (2013.01); *G08G 1/09* (2013.01); *G08G 1/16* (2013.01); *G08G 1/163* (2013.01); *G08G 1/166* (2013.01); *G08G 1/22* (2013.01)

(58) Field of Classification Search
  USPC .......................................................... 340/463
  See application file for complete search history.

(56) References Cited

U.S. PATENT DOCUMENTS

| | | | | |
|---|---|---|---|---|
| 4,132,983 | A * | 1/1979 | Shapiro | G08B 5/38 340/331 |
| 4,841,278 | A * | 6/1989 | Tezuka | F21S 9/037 340/331 |
| 6,356,189 | B1 | 3/2002 | Fujimaki | |
| 2002/0175831 | A1* | 11/2002 | Bergan | G08G 1/081 340/908.1 |
| 2004/0100396 | A1* | 5/2004 | Antico | B63B 51/00 340/985 |
| 2004/0105264 | A1* | 6/2004 | Spero | B60Q 1/04 362/276 |
| 2004/0113817 | A1* | 6/2004 | Novak | G01S 1/70 340/983 |
| 2004/0183694 | A1* | 9/2004 | Bauer | G08G 1/095 340/907 |
| 2004/0212993 | A1* | 10/2004 | Morgan | F21V 33/004 362/231 |
| 2005/0040970 | A1* | 2/2005 | Hutchins | G08G 1/096716 340/907 |
| 2006/0152935 | A1* | 7/2006 | Petkov | B60Q 1/1423 362/459 |
| 2007/0115139 | A1* | 5/2007 | Witte | G08G 1/07 340/909 |
| 2007/0222640 | A1* | 9/2007 | Guelzow, II | G08B 5/006 340/908 |
| 2008/0167819 | A1* | 7/2008 | Breed | G08G 1/161 701/300 |
| 2009/0115336 | A1* | 5/2009 | Wang | B63B 45/02 315/136 |
| 2010/0179720 | A1* | 7/2010 | Lin | G07C 5/008 701/31.4 |
| 2011/0141242 | A1* | 6/2011 | Fernandez Alvarez | G06K 9/00818 348/47 |
| 2012/0256765 | A1* | 10/2012 | Selevan | G08G 1/07 340/907 |
| 2012/0299373 | A1* | 11/2012 | Yoshida | H02J 50/12 307/9.1 |
| 2013/0018528 | A1* | 1/2013 | Kelly | B60T 7/18 701/2 |
| 2013/0124012 | A1* | 5/2013 | Shida | G08G 1/0104 701/2 |
| 2013/0238170 | A1* | 9/2013 | Klinger | G05D 1/104 701/3 |
| 2013/0308327 | A1* | 11/2013 | Piccioni | B60D 1/64 362/485 |
| 2014/0081479 | A1* | 3/2014 | Vian | G06Q 50/02 701/2 |
| 2014/0210343 | A1* | 7/2014 | Kulandaivellu | B60Q 1/143 315/82 |
| 2014/0277900 | A1* | 9/2014 | Abhyanker | G01C 21/32 701/25 |
| 2015/0015391 | A1 | 1/2015 | Pimentel | |
| 2015/0100192 | A1* | 4/2015 | Lee | G08G 1/22 701/23 |
| 2015/0370255 | A1* | 12/2015 | Harvey | B62D 15/0285 701/24 |
| 2016/0021178 | A1* | 1/2016 | Liu | H04W 76/10 370/216 |
| 2016/0061396 | A1* | 3/2016 | Bosua | G08C 23/04 362/231 |
| 2017/0123421 | A1* | 5/2017 | Kentley | G01C 21/26 |
| 2017/0131406 | A1* | 5/2017 | Li | G01C 21/20 |

FOREIGN PATENT DOCUMENTS

| | | |
|---|---|---|
| JP | 2003123180 A | 4/2003 |
| JP | 2013196040 A | 9/2013 |
| JP | 2014130409 A | 7/2014 |

OTHER PUBLICATIONS

Written Opinion (PCT/ISA/237) issued by the International Searching Authority in corresponding International Application No. PCT/JP2016/088228, dated Mar. 21, 2017.
Communication dated Jul. 31, 2019, issued by the European Patent Office in counterpart European Application No. 16878823.0.

* cited by examiner

VEHICLE ILLUMINATION DEVICE, VEHICLE AND ILLUMINATION CONTROL SYSTEM

TECHNICAL FIELD

The present disclosure relates to a vehicle illumination device. In particular, the present disclosure relates to a vehicle illumination device provided to a vehicle capable of traveling in an automatic driving mode. Also, the present disclosure relates to a vehicle having a vehicle illumination device, and an illumination control system including the vehicle.

BACKGROUND ART

Currently, research on an automatic driving technique of an automobile has been actively conducted in each country, and each country is considering the legislation so as to enable a vehicle (hereinafter, a "vehicle" refer to an automobile) to travel in an automatic driving mode on public roads. Here, in the automatic driving mode, a vehicle system automatically controls travelling of a vehicle. Specifically, in the automatic driving mode, the vehicle system performs at least one of a steering control (control a travelling direction of the vehicle), a brake control and an accelerator control (control of braking and acceleration/deceleration of the vehicle) based on various information obtained from a camera, a sensor, a radar and the like. On the other hand, in a manual driving mode to be described later, a driver controls the travelling of the vehicle, as in most of conventional vehicles. Specifically, in the manual driving mode, the travelling of the vehicle is controlled in conformity with a driver's operation (a steering operation, a braking operation, and an accelerator operation), and the vehicle system does not automatically perform the steering control, the brake control and the accelerator control. Meanwhile, the driving mode of the vehicle is not a concept existing only in some vehicles but a concept existing in all vehicles including conventional vehicles having no automatic driving function. For example, the driving mode of the vehicle is classified in accordance with a vehicle control method or the like.

Thus, in the future, it is expected that vehicles travelling in the automatic driving mode (hereinafter, appropriately referred to as "automatic driving vehicle") and vehicles travelling in the manual driving mode (hereinafter, appropriately referred to as "manual driving vehicle") coexist on public roads. Particularly, in a situation where the vehicles travelling in the automatic driving mode and the vehicles travelling in the manual driving mode coexist, it is preferable that a state of inter-vehicle communication between one automatic driving vehicle and the other automatic driving vehicle is presented to an outside, from a standpoint of safety.

Patent Document 1 discloses an automatic follow-up travelling system in which a following vehicle can automatically follow a preceding vehicle. In the automatic follow-up travelling system, each of the preceding vehicle and the following vehicle has a display device, character information for preventing the other vehicle from intruding between the preceding vehicle and the following vehicle is displayed on the display device of the preceding vehicle, and character information indicative of the automatic follow-up travelling mode is displayed on the display device of the following vehicle.

PRIOR ART DOCUMENT

Patent Document

Patent Document 1: JP-A-H09-277887

SUMMARY

Problem to be Solved

Patent Document 1 does not consider a vehicle illumination device and an illumination control system capable of presenting information, which indicates that one automatic driving vehicle is performing communication with the other automatic driving vehicle under specific situations (for example, a situation at an intersection point), toward an outside such as a pedestrian and the like.

An object of the present disclosure is to provide a vehicle illumination device capable of presenting information, which indicates that one automatic driving vehicle is performing communication with the other automatic driving vehicle, toward an outside such as a pedestrian and the like. Another object of the present disclosure is to provide a vehicle having the vehicle illumination device and an illumination control system including the vehicle.

Means for Solving the Problem

A vehicle illumination device according to an aspect of the present disclosure is a vehicle illumination device provided to a vehicle capable of traveling in an automatic driving mode. The vehicle illumination device includes:

a first illumination unit configured to irradiate light toward an outside of the vehicle; and a first illumination control unit configured to control the first illumination unit based on an illumination control signal transmitted from another vehicle capable of traveling in the automatic driving mode and including the second illumination unit, such that an illumination state of the first illumination unit corresponds to an illumination state of a second illumination unit.

According to the above configuration, it is possible to provide the vehicle illumination device capable of presenting information, which indicates that a host vehicle capable of traveling in the automatic driving mode is performing communication with the other vehicle capable of traveling in the automatic driving mode, toward an outside such as a pedestrian and the like. In other words, it is possible to visualize a state of inter-vehicle communication between the vehicles capable of traveling in the automatic driving mode by the vehicle illumination device. For example, since the pedestrian and the like can check safety of the host vehicle and the other vehicle by seeing the information indicating that the host vehicle is performing communication with the other vehicle, the pedestrian can cross in relief a crosswalk and the like. Also, since a driver of a separate vehicle can check safety of the host vehicle and the other vehicle by seeing the information indicating that the host vehicle is performing communication with the other vehicle, the driver can pass in relief an intersection point or overtake in relief the host vehicle and the other vehicle.

Also, the first illumination control unit may be configured to control the first illumination unit to blink in synchronization with the second illumination unit.

According to the above configuration, the pedestrian and the like can perceive that the host vehicle is performing communication with the other vehicle by seeing a situation where the first illumination unit is blinking in synchronization with the second illumination unit.

Also, the first illumination control unit may be configured to control the first illumination unit such that an illumination color of the first illumination unit corresponds to an illumination color of the second illumination unit.

According to the above configuration, the pedestrian and the like can perceive that the host vehicle is performing communication with the other vehicle by seeing a situation where the illumination color of the first illumination unit corresponds to the illumination color of the second illumination unit.

Also, a vehicle capable of traveling in an automatic driving mode may be provided which includes the vehicle illumination device, a first wireless communication unit configured to receive the illumination control signal and a vehicle control unit configured to control traveling of the vehicle.

According to the above configuration, it is possible to provide the vehicle capable of presenting information, which indicates that the host vehicle capable of traveling in the automatic driving mode is performing communication with the other vehicle capable of traveling in the automatic driving mode, toward an outside such as a pedestrian and the like.

An illumination control system according to an embodiment of the present disclosure includes:

a second vehicle capable of traveling in an automatic driving mode and including:
  a second illumination unit configured to irradiate light toward an outside;
  a second illumination control unit configured to control the second illumination unit;
  a control signal generation unit configured to generate an illumination control signal; and
  a second wireless communication unit configured to transmit the illumination control signal; and
a first vehicle capable of traveling in the automatic driving mode and including:
  a first wireless communication unit configured to receive the illumination control signal;
  a first illumination unit configured to irradiate light toward the outside; and
  a first illumination control unit configured to control the first illumination unit based on the illumination control signal such that an illumination state of the first illumination unit corresponds to an illumination state of the second illumination unit.

According to the above configuration, it is possible to provide the illumination control system capable of presenting information, which indicates that the first vehicle capable of traveling in the automatic driving mode is performing communication with the second vehicle capable of traveling in the automatic driving mode, toward an outside such as a pedestrian and the like.

Also, when the first vehicle exists within a predetermined range from the second vehicle, the first wireless communication unit may be able to receive the illumination control signal from the second wireless communication unit.

According to the above configuration, the first vehicle existing within the predetermined range from the second vehicle can present information, which indicates that the first vehicle is performing communication with the second vehicle, toward an outside such as a pedestrian and the like. Accordingly, the pedestrian and the like in the vicinity of the first vehicle or the second vehicle can check the safety of the first vehicle and the second vehicle by seeing the information.

Also, when the first vehicle and the second vehicle exist in the vicinity of an intersection point, the first wireless communication unit may be able to receive the illumination control signal from the second wireless communication unit.

According to the above configuration, the first vehicle existing in the vicinity of the intersection point can present information, which indicates that the first vehicle is performing communication with the second vehicle, toward an outside such as a pedestrian and the like. Accordingly, the pedestrian and the like in the vicinity of the intersection point can check the safety of the first vehicle and the second vehicle by seeing the information, and can cross in relief a crosswalk and the like.

Also, the second vehicle may be a vehicle that appears in the vicinity of the intersection point temporally earlier than the first vehicle.

According to the above configuration, a vehicle that appears temporally earliest in the vicinity of the intersection point is a master vehicle (second vehicle), and a vehicle that appears in the vicinity of the intersection point temporally later than the master vehicle is a slave vehicle (first vehicle).

Also, the first vehicle and the second vehicle may belong to a group of vehicles traveling in a row traveling mode, and
  the second vehicle may be a leading vehicle of the group of vehicles and the first vehicle may be a following vehicle of the group of vehicles.

According to the above configuration, a leading vehicle of the group of vehicles traveling in the row traveling mode is a master vehicle (second vehicle), and a following vehicle except the leading vehicle is a slave vehicle (first vehicle). Also, it is possible to provide the illumination control system capable of presenting information, which indicates that the leading vehicle and following vehicle belonging to the group of vehicles traveling in the row traveling mode are performing communication with each other, toward an outside. For example, since a driver of a following vehicle traveling in a manual driving mode behind the group of vehicles can visually recognize that the group of vehicles is traveling in the row traveling mode, the driver can overtake in relief the group of vehicles.

Effects

According to the present disclosure, it is possible to provide the vehicle illumination device capable of presenting the information, which indicates that one automatic driving vehicle is performing communication with the other automatic driving vehicle, toward an outside such as a pedestrian, and the like.

DETAILED DESCRIPTION OF EMBODIMENTS

Figure 1A:
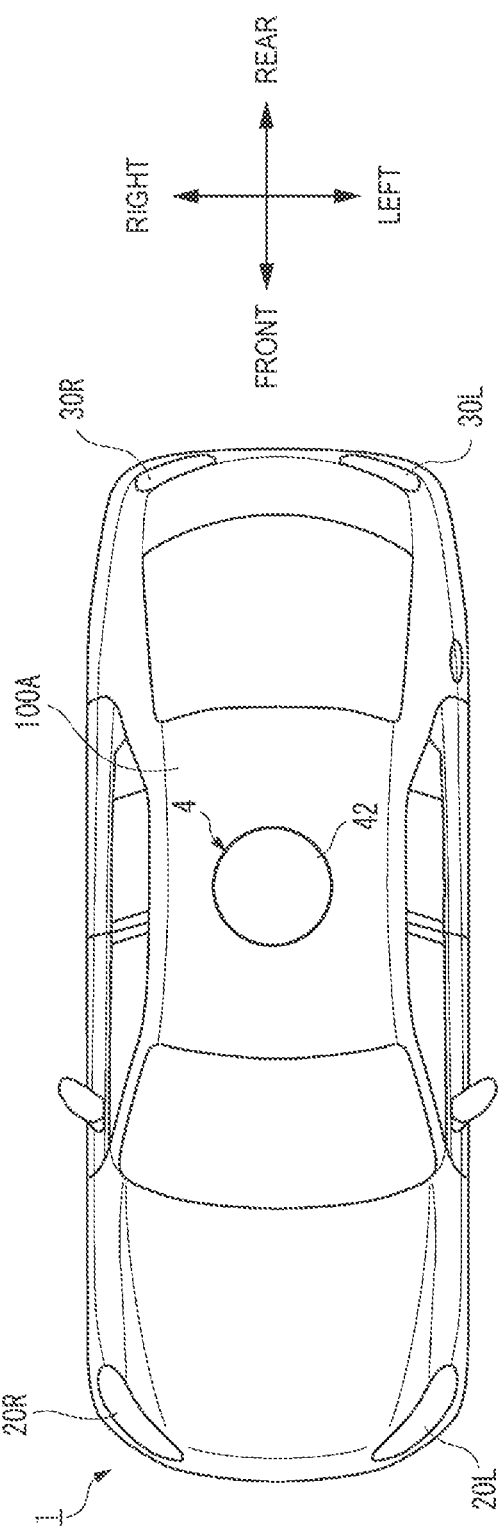
FIG. 1A is a plan view of a vehicle in which a vehicle illumination device according to an embodiment of the present invention is mounted.

Hereinafter, an embodiment of the present disclosure (hereinafter, referred to as "the embodiment") will be described with reference to the drawings. Meanwhile, in the below, for the sake of convenience of description, the description of members having the same reference numerals as those already described in the description of the embodiment will be omitted. Also, for the sake of convenience of description, dimensions of the respective members shown in the drawings may be different from actual dimensions of the respective members.

Also, in the description of the embodiment, for the sake of convenience of description, "the right and left direction", "the front and rear direction" and "the vertical direction" will be appropriately mentioned. The directions are relative directions set with respect to a vehicle 1 shown in FIG. 1. Here, "the vertical direction" is a direction including "the upward direction" and "the downward direction". "the front and rear direction" is a direction including "the forward direction" and "the rearward direction". "the right and left direction" is a direction including "the leftward direction" and "the rightward direction".

Figure 1B:
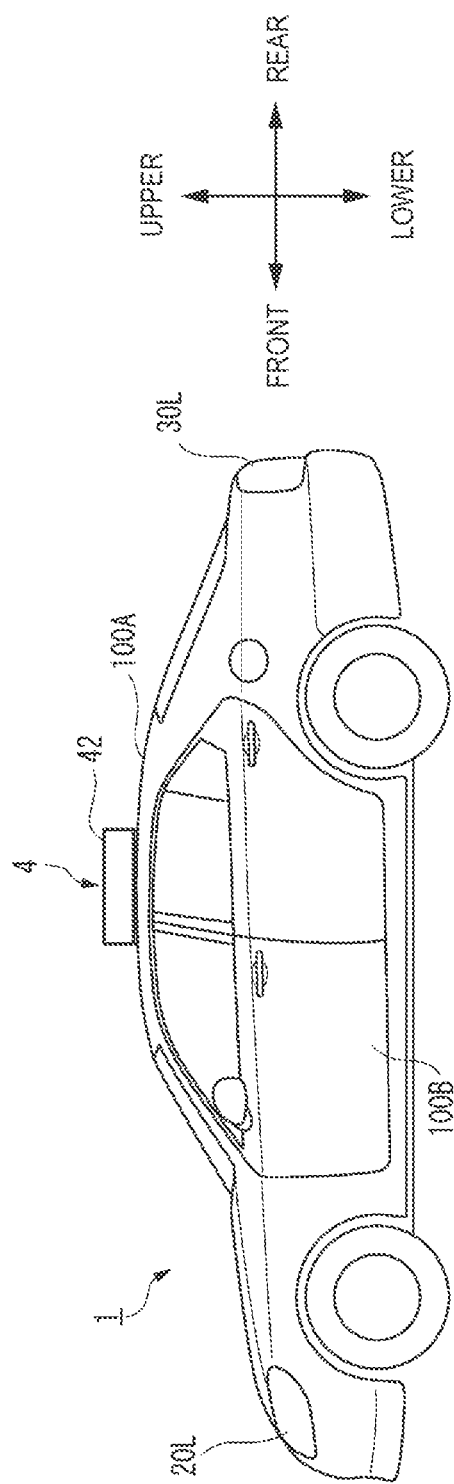
FIG. 1B is a left side view of the vehicle shown in FIG. 1A.

A vehicle illumination device 4 according to the embodiment (hereinafter, simply referred to as "illumination device 4") is described. FIG. 1A is a plan view of the vehicle 1, and FIG. 1B is a left side view of the vehicle 1. The vehicle 1 is a vehicle capable of traveling in an automatic driving mode, and includes the illumination device 4. The illumination device 4 includes an illumination unit 42, and an illumination control unit 43 (refer to FIG. 2). The illumination unit 42 is arranged on a vehicle body roof 100A of the vehicle 1, and is configured to irradiate light toward an outside of the vehicle 1. In particular, the illumination unit 42 is configured to irradiate light over an entire circumference (360°) of the illumination unit 42 in a horizontal direction. Here, the horizontal direction refers to a direction including the front and rear direction and the right and left direction.

Meanwhile, in the embodiment, the single illumination unit 42 is arranged on the vehicle body roof 100A. However, the number, arrangement, shape and the like of the illumination unit 42 are not particularly limited. For example, the two illumination units 42 of the four illumination units 42 may be respectively arranged in a left headlamp 20L and a right headlamp 20R, and the other illumination units 42 may be respectively arranged in a left rear combination lamp 30L and a right rear combination lamp 30R. Also, the illumination unit 42 may be arranged to surround a side surface 100B of the vehicle 1.

Figure 2:
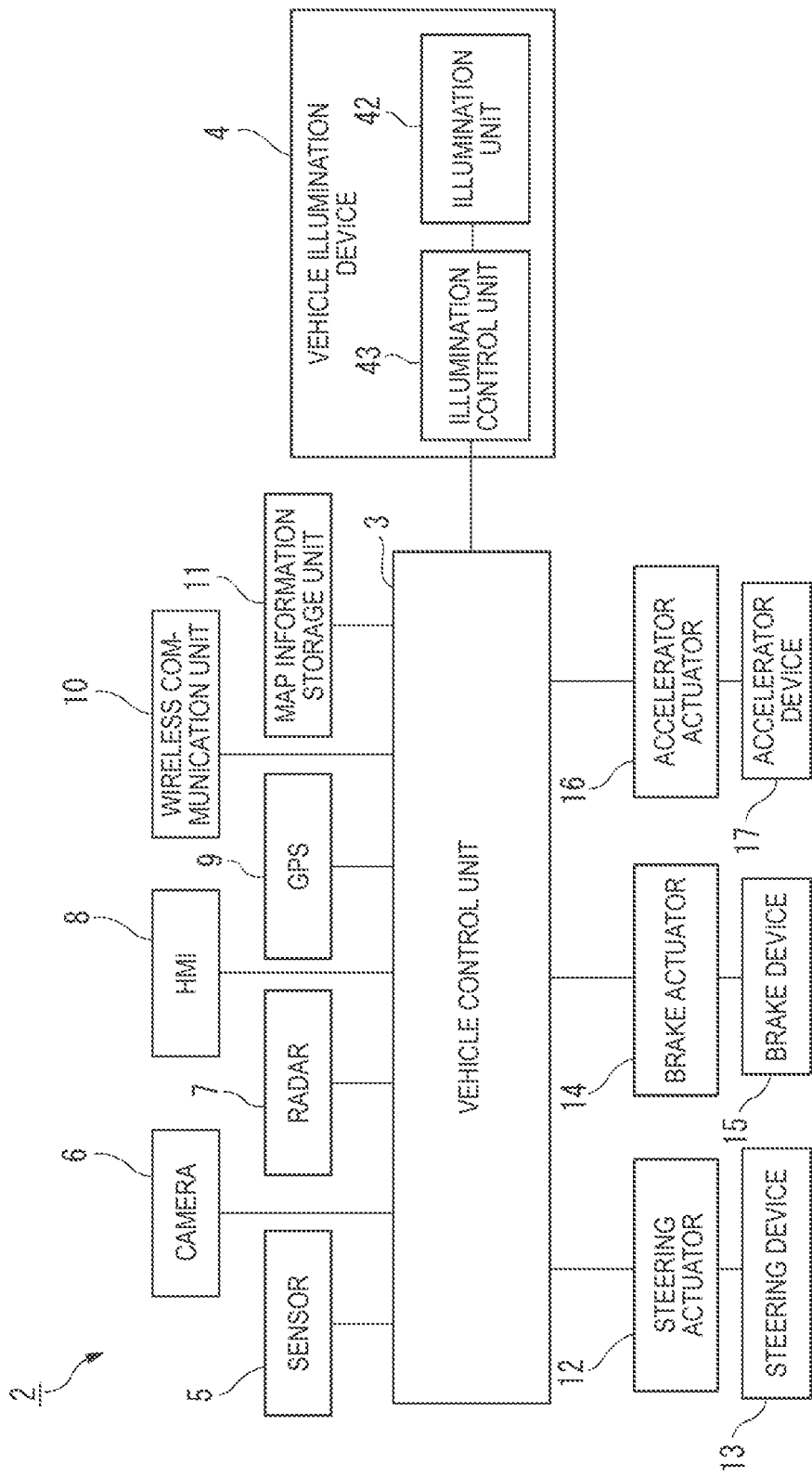
FIG. 2 is a block diagram of a vehicle system including the vehicle illumination device according to the embodiment of the present invention.

Subsequently, a vehicle system 2 of the vehicle 1 is described with reference to FIG. 2. FIG. 2 is a block diagram of the vehicle system 2. As shown in FIG. 2, the vehicle system 2 includes a vehicle control unit 3, the illumination device 4, a sensor 5, a camera 6, a radar 7, a HMI (Human Machine Interface) 8, a GPS (Global Positioning System) 9, a wireless communication unit 10 (the first wireless communication unit), and a map information storage 11. In addition, the vehicle system 2 includes a steering actuator 12, a steering device 13, a brake actuator 14, a brake device 15, an accelerator actuator 16, and an accelerator device 17.

The vehicle control unit 3 is configured to control travelling of the vehicle 1. The vehicle control unit 3 is configured by, for example, an electronic control unit (ECU). The electronic control unit includes a microcontroller having a processor and a memory, and other electronic circuits (for example, transistors, and the like). The processor is, for example, a CPU (Central Processing Unit), an MPU (Micro Processing Unit) and/or a GPU (Graphics Processing Unit). The memory includes a ROM (Read Only Memory) in which diverse vehicle control programs (for example, an artificial intelligence (AI) program for automatic driving, and the like) are stored, and a RAM (Random Access Memory) in which diverse vehicle control data is temporarily stored. The processor is configured to develop, on the RAM, a program designated from the diverse vehicle control programs stored in the ROM and to execute a variety of processes in cooperation with the RAM.

The illumination device 4 includes the illumination unit 42 and the illumination control unit 43. The illumination unit 42 includes one or more light emitting elements such as LEDs (Light Emitting Diodes) or laser and is configured to irradiate light toward the outside of the vehicle 1. The illumination control unit 43 is configured by an electronic control unit (ECU). The illumination control unit 43 is electrically connected to a power supply (not shown), and includes a microcontroller having a processor such as a CPU and a GPU and a memory such as a ROM and a RAM, and other electronic circuits (for example, a drive circuit such as an LED driver). In the embodiment, the vehicle control unit 3 and the illumination control unit 43 are provided as separate components but may be integrally configured. That is, the illumination control unit 43 and the vehicle control unit 3 may be configured by a single electronic control unit. The illumination control unit 43 is configured to control the illumination unit 42 based on an illumination control signal transmitted from another vehicle including an illumination unit, such that an illumination state of the illumination unit 42 corresponds to an illumination state of the illumination unit of the other vehicle. For example, the illumination control unit 43 may be configured to control the illumination unit 42 to blink in synchronization with the illumination unit of the other vehicle. Also, the illumination control unit 43 may be configured to control the illumination unit 42 such that an illumination color of the illumination unit 42 corresponds to an illumination color of the illumination unit of the other vehicle.

The sensor 5 includes an acceleration sensor, a speed sensor, a gyro sensor, and the like. The sensor 5 is configured to detect a travelling condition of the vehicle 1 and to output travelling condition information to the vehicle control unit 3. The sensor 5 may further include a seating sensor configured to detect whether a driver is sitting on a driver seat, a face direction sensor configured to detect a direction of a driver's face, an external weather sensor configured to detect an external weather condition, a passenger detection sensor configured to detect whether there is a passenger in a vehicle, and the like.

The camera 6 is, for example, a camera including an imaging device such as a CCD (Charge-Coupled Device) and CMOS (complementary MOS). The radar 7 is a millimeter wave radar, a microwave radar, a laser radar, or the like. The camera 6 and/or the radar 7 are configured to detect surrounding environments (other vehicles, pedestrians, road shapes, traffic signs, obstacles, and the like) of the vehicle 1 and to output surrounding environment information to the vehicle control unit 3.

The HMI 8 includes an input unit configured to receive an input operation from a driver and an output unit configured to output the travelling information and the like to the driver. The input unit includes a steering wheel, an accelerator pedal, a brake pedal, a driving mode changeover switch for switching the driving mode of the vehicle 1, and the like. The output unit is a display for displaying diverse travelling information.

The GPS 9 is configured to acquire current position information of the vehicle 1 and to output the acquired current position information to the vehicle control unit 3. The wireless communication unit 10 is configured to receive information (for example, traveling information, and the like) relating to other vehicles around the vehicle 1 from the other vehicles and to transmit information (for example, traveling information, and the like) relating to the vehicle 1 to the other vehicles (inter-vehicle communication). Also, the wireless communication unit 10 is configured to receive an illumination control signal from a traffic infrastructure equipment. Also, the wireless communication unit 10 is configured to receive infrastructure information from the traffic infrastructure equipment and to transmit the traveling information of the vehicle 1 to the traffic infrastructure equipment (road-to-vehicle communication). The vehicle 1 may be configured to perform communication with the other vehicle and the traffic infrastructure equipment directly or via an access point. The map information storage 11 is an external storage device such as a hard disk drive in which map information is stored, and is configured to output the map information to the vehicle control unit 3.

When the vehicle 1 travels in an automatic driving mode, the vehicle control unit 3 automatically generates at least one of a steering control signal, an accelerator control signal and a brake control signal, based on the travelling condition information, the surrounding environment information, the current position information, the map information, and the like. The steering actuator 12 is configured to receive the steering control signal from the vehicle control unit 3 and to control the steering device 13 based on the received steering control signal. The brake actuator 14 is configured to receive the brake control signal from the vehicle control unit 3 and to control the brake device 15 based on the received brake control signal. The accelerator actuator 16 is configured to receive the accelerator control signal from the vehicle control unit 3 and to control the accelerator device 17 based on the received accelerator control signal. In this way, in the automatic driving mode, the travelling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in conformity with a manual operation of a driver on the accelerator pedal, the brake pedal and the steering wheel. In this way, in the manual driving mode, the steering control signal, the accelerator control signal and the brake control signal are generated by the manual operation of the driver, so that the travelling of the vehicle 1 is controlled by the driver.

Subsequently, the driving mode of the vehicle 1 is described. The driving mode includes an automatic driving mode and a manual driving mode. The automatic driving mode includes a full-automatic driving mode, an advanced driving support mode, and a driving support mode. In the full-automatic driving mode, the vehicle system 2 is configured to automatically perform all of the travelling controls of the steering control, the brake control and the accelerator control, and the driver is not in a state where it is possible to drive the vehicle 1. In the advanced driving support mode, the vehicle system 2 is configured to automatically perform all of the travelling controls of the steering control, the brake control and the accelerator control, and the driver does not drive the vehicle 1 although the driver is in a state where it is possible to drive the vehicle 1. In the driving support mode, the vehicle system 2 is configured to automatically perform a part of the travelling controls of the steering control, the brake control and the accelerator control, and the driver drives the vehicle 1 under the driving support of the vehicle system 2. On the other hand, in the manual driving mode, the vehicle system 2 is configured not to automatically perform the travelling controls, and the driver drives the vehicle 1 without the driving support of the vehicle system 2.

Also, the driving mode of the vehicle 1 may be switched by operating a driving mode changeover switch. In this case, the vehicle control unit 3 is configured to switch the driving mode of the vehicle 1 among the four driving modes (the full-automatic driving mode, the advanced driving support mode, the driving support mode, and the manual driving mode) in accordance with a driver's operation on the driving mode changeover switch. Also, the driving mode of the vehicle 1 may be automatically switched based on information relating to a travel-allowed section where travelling of an automatic driving vehicle is allowed or a travel-prohibited section where the travelling of the automatic driving vehicle is prohibited or information relating to the external weather condition. In this case, the vehicle control unit 3 is configured to switch the driving mode of the vehicle 1, based on such information. Also, the driving mode of the vehicle 1 may be automatically switched by using a seating sensor, a face direction sensor, or the like. In this case, the vehicle control unit 3 is configured to switch the driving mode of the vehicle 1, based on an output signal from the seating sensor or the face direction sensor.

<Illumination Control System 100>

Figure 3:
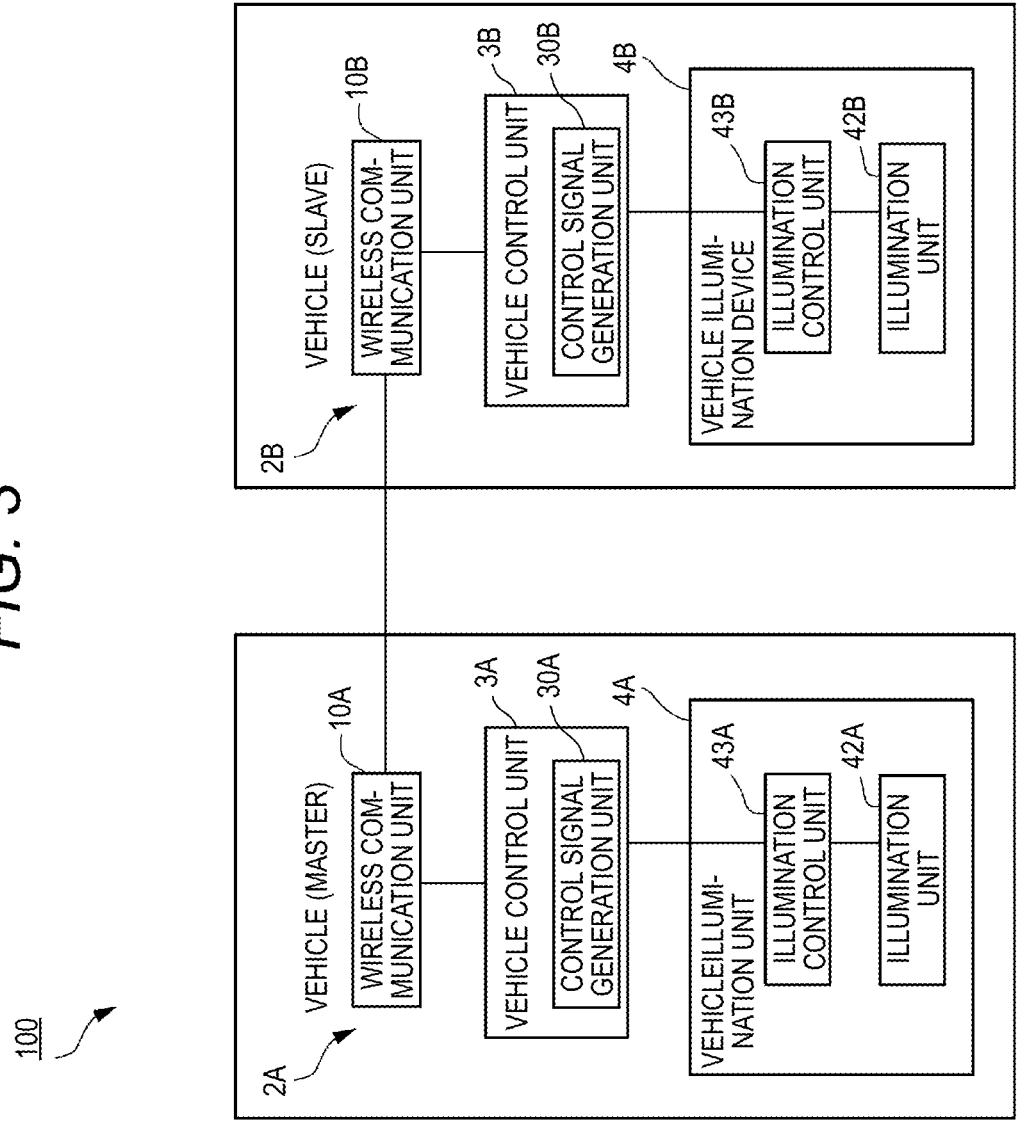
FIG. 3 depicts a configuration of an illumination control system according to the embodiment of the present invention.

Subsequently, an illumination control system 100 is described with reference to FIG. 3. FIG. 3 depicts a configuration of the illumination control system 100 according to the embodiment. As shown in FIG. 3, the illumination control system 100 includes a vehicle 1A (second vehicle) and a vehicle 1B (first vehicle) capable of traveling in the automatic driving mode. In the embodiment, the vehicle 1A is a master vehicle, and the vehicle 1B is a slave vehicle. Here, the master vehicle is a vehicle configured to transmit an illumination control signal, and the slave vehicle is a vehicle configured to receive the illumination control signal. Vehicle systems 2A, 2B of the vehicles 1A, 1B have the same configuration as the vehicle system 2 of the vehicle 1 shown in FIG. 2. Also, for the sake of convenience of description, in the vehicles 1A, 1B of FIG. 3, only some constitutional elements are shown (for example, it should be noted that the constitutional elements such as the camera, the sensor, the radar and the like are omitted for the sake of convenience of description).

A wireless communication unit 10A and a wireless communication unit 10B (the first wireless communication unit) have the same configuration as the wireless communication unit 10 shown in FIG. 2. Vehicle control units 3A, 3B have the same configuration as the vehicle control unit 3 shown in FIG. 2. The vehicle control unit 3A includes a control signal generation unit 30A configured to generate an illumination control signal, and the vehicle control unit 3B includes a control signal generation unit 30B configured to generate an illumination control signal. In the embodiment, since the vehicle 1B is a slave vehicle, the control signal generation unit 30B does not generate an illumination control signal. On the other hand, when the vehicle 1B is a master vehicle, the control signal generation unit 30B generates an illumination control signal. Vehicle illumination devices 4A, 4B (hereinafter, simply referred to as the illumination devices 4A, 4B) have the same configuration as the illumination device 4 shown in FIG. 2. Also, an illumination control unit 43A (the second illumination control unit) and an illumination control unit 43B (the first illumination control unit) have the same configuration as the illumination control unit 43 shown in FIG. 2. An illumination unit 42A (the second illumination unit) and an illumination unit 42B (the first illumination unit) have the same configuration as the illumination unit 42 shown in FIG. 2. Meanwhile, in the illumination control system 100 shown in FIG. 3, the two vehicles 1A, 1B are shown. However, the number of the vehicles is not particularly limited.

<Operations of Illumination Control System 100 at Intersection Point>

Figure 4:
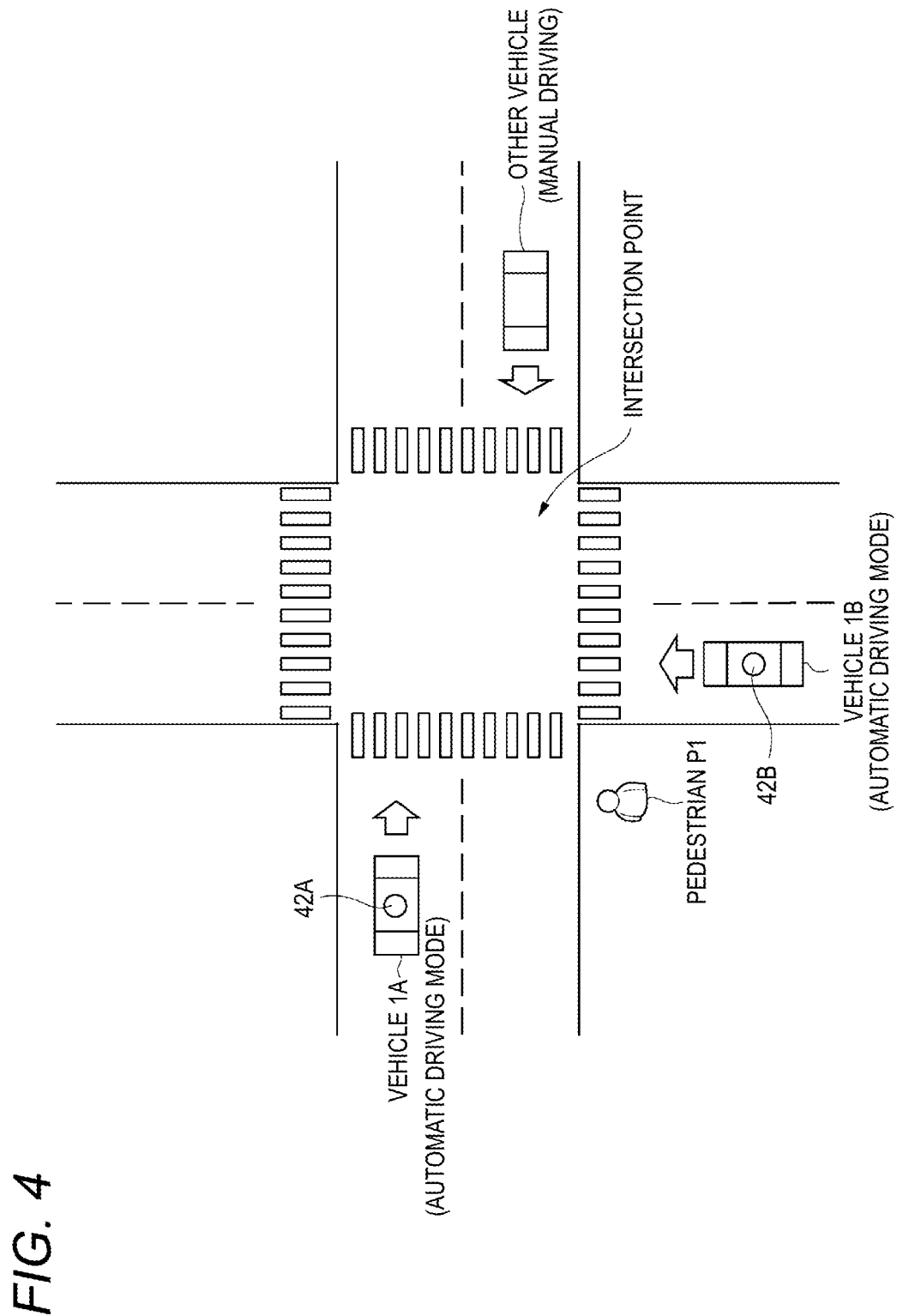
FIG. 4 illustrates a situation where an illumination state of an illumination unit of one vehicle and an illumination state of an illumination unit of the other vehicle correspond to each other at an intersection point.
Figure 5:
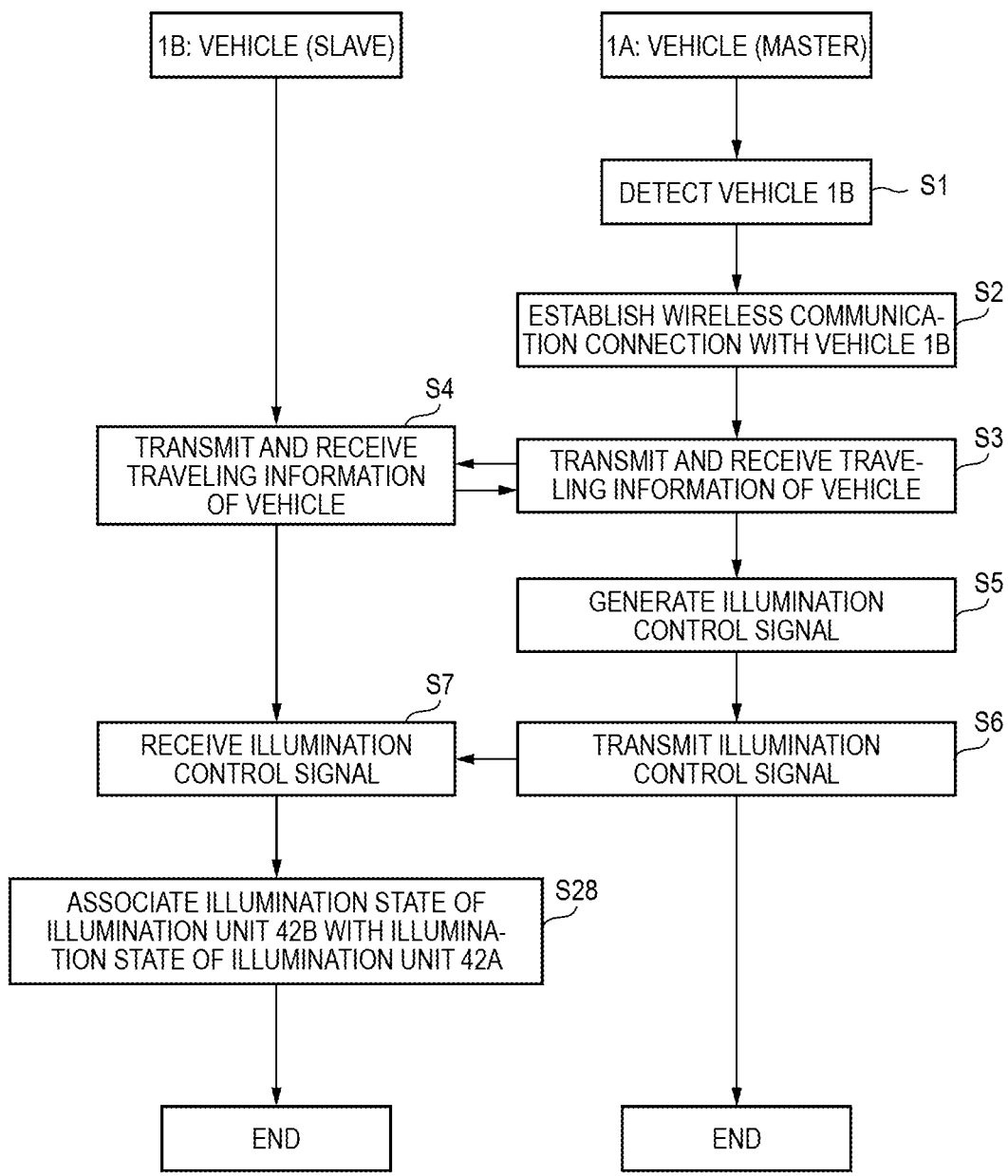
FIG. 5 is a sequence diagram for illustrating an example of an operation of the illumination control system.

Subsequently, operations of the illumination control system 100 at an intersection point are described with reference to FIGS. 3 to 5. FIG. 4 illustrates a situation where an illumination state of the illumination unit 42A of the vehicle 1A and an illumination state of the illumination unit 42B of the vehicle 1B correspond to each other at an intersection point. As shown in FIG. 4, the vehicles 1A, 1B exist in the vicinity of the intersection point, the vehicle 1A is a master vehicle and the vehicle 1B is a slave vehicle. An example of a method of determining the master vehicle and the slave vehicle will be described later. When the vehicles 1A, 1B exist in the vicinity of the intersection point, the wireless communication unit 10B can receive the illumination control signal, the traveling information of the vehicle 1A and the like from the wireless communication unit 10A. Also, when the vehicle 1B exists within a predetermined range from the vehicle 1A, the wireless communication unit 10B can receive the illumination control signal, the traveling information of the vehicle 1A and the like from the wireless communication unit 10A.

Subsequently, an example of the operation of the illumination control system 100 is described with reference to FIG. 5. FIG. 5 is a sequence diagram for illustrating an example of the operation of the illumination control system 100. In this example, it is assumed that the vehicle 1A appears in the vicinity of the intersection point temporally earlier than the vehicle 1B and the vehicle 1A becomes a master vehicle. As shown in FIG. 5, the vehicle 1A first detects the vehicle 1B (step S1). The vehicle 1A may detect that the vehicle 1A exists in the vicinity of the intersection point based on the surrounding environment information and the map information, and then detect the vehicle 1B by using a camera or a sensor. Also, the vehicle 1A may detect the vehicle 1B by receiving information, which indicates that there is the vehicle 1B, from the traffic infrastructure equipment arranged in the vicinity of the intersection point. Also, the vehicle 1A may detect the vehicle 1B by broadcasting a beacon toward an outside with a predetermined period and receiving a response signal to the broadcast beacon from the vehicle 1B. In the meantime, when the vehicle 1B exists within the predetermined range from the vehicle 1A, the vehicle 1B can receive the beacon broadcast from the vehicle 1A.

Then, in step S2, the vehicle 1A establishes wireless communication connection with the vehicle 1B. The vehicle 1A and the vehicle 1B may directly perform communication with each other in an ad hook mode. For example, wireless communication connection is established between the vehicle 1A and the vehicle 1B by a passive scan method or an active scan method. In the case of the active scan method, the wireless communication unit 10A transmits the beacon including information relating to the wireless communication connection to the vehicle 1B with a predetermined period, in accordance with a command of the vehicle control unit 3A. The wireless communication unit 10B receives the beacon transmitted from the vehicle 1A. Thereafter, the vehicle 1A establishes wireless communication connection with the vehicle 1B, through authentication/association between the vehicle 1A and the vehicle 1B. Also, the vehicle 1A and the vehicle 1B may perform communication with each other via the traffic infrastructure equipment having an access point function.

Then, in step S3, the vehicle 1A transmits, to the vehicle 1B, the traveling information of the vehicle 1A (for example, the traveling information indicative of left turn/right turn/ straight advancing at the intersection point), for example. In particular, the wireless communication unit 10A transmits the traveling information of the vehicle 1A to the vehicle 1B, in accordance with a command of the vehicle control unit 3A. Then, the wireless communication unit 10B of the vehicle 1B receives the traveling information of the vehicle 1A from the vehicle 1A (step S4). Similarly, the vehicle 1B may transmit the traveling information of the vehicle 1B to the vehicle 1A, and the vehicle 1A may receive the traveling information of the vehicle 1B from the vehicle 1B. In the case of the vehicle 1B traveling in the automatic driving mode, the vehicle control unit 3B automatically controls the traveling of the vehicle 1B, based on the surrounding environment information and the like acquired by the vehicle system 2B and the traveling information of the vehicle 1A. Similarly, in the case of the vehicle 1A traveling in the automatic driving mode, the vehicle control unit 3A automatically controls the traveling of the vehicle 1A, based on the surrounding environment information and the like acquired by the vehicle system 2A and the traveling information of the vehicle 1B. In this way, the vehicle 1A (1B) acquires the traveling information of the vehicle 1B (1A), so that it is possible to execute the more correct automatic driving control of the vehicle 1A (1B).

Then, the control signal generation unit 30A generates an illumination control signal indicative of an illumination state of the illumination unit 42A (step S5). Then, the wireless communication unit 10A transmits the generated illumination control signal to the vehicle 1B, in accordance with a command of the vehicle control unit 3A (step S6).

The wireless communication unit 10B of the vehicle 1B receives the illumination control signal from the vehicle 1A (step S7). Then, the illumination control unit 43B controls the illumination unit 42B such that an illumination state of the illumination unit 42B corresponds to an illumination state of the illumination unit 42A, based on the received illumination control signal (step S8). For example, when the illumination unit 42A is controlled by the illumination control unit 43A to blink with a predetermined period, the illumination control unit 43B may control the illumination unit 42B to blink in synchronization with the illumination unit 42A, based on the illumination control signal indicative of blinking control information of the illumination unit 42A. Also, when the illumination unit 42A is controlled by the illumination control unit 43A such that an illumination color of the illumination unit 42A is a predetermined illumination color, the illumination control unit 43B may control the illumination unit 42B such that an illumination color of the illumination unit 42B corresponds to the illumination color of the illumination unit 42A, based on the illumination control signal indicative of the illumination color of the illumination unit 42A. Also, at a point of time at which the wireless communication connection is established between the vehicle 1A and the vehicle 1B, the illumination control unit 43A may blink the illumination unit 42A or change the illumination color of the illumination unit 42A from a first illumination color to a second illumination color. In this way, the series of illumination control processing is executed.

Meanwhile, in the embodiment, the vehicle 1A is set as the master vehicle, and the vehicle 1B is set as the slave vehicle. However, even when the vehicle 1B is set as the master vehicle and the vehicle 1A is set as the slave vehicle, the illumination control is executed between the vehicles by a similar method. In this case, the control signal generation unit 30B of the vehicle control unit 3B generates the illumination control signal.

Meanwhile, in step S3, as an example, the vehicle 1A transmits the traveling information of the vehicle 1A to the vehicle 1B. However, instead of this configuration, the vehicle 1A may be configured to transmit, to the vehicle 1B, predetermined information other than the traveling information. Also, in step S3, the control signal generation unit 30A may generate a traveling control signal for controlling the traveling of the vehicle 1B, and the wireless communication unit 10A may transmit the generated traveling control signal to the vehicle 1B. In this case, the vehicle control unit 3B executes the automatic traveling control at the intersection point, based on the traveling control signal transmitted from the vehicle 1A.

In the meantime, the vehicle 1A may establish wireless communication connection with an electronic device (for example, a portable phone, a smart phone, a tablet, a wearable device and the like) carried by a pedestrian P1 in the vicinity of the intersection point. In this case, the vehicle 1A (the wireless communication unit 10A) may establish wireless communication connection with the electronic device carried by the pedestrian (hereinafter, simply referred to as the electronic device) and then transmit the illumination control signal indicative of the illumination state of the illumination unit 42A to the electronic device. A control unit of the electronic device may control a display unit (or a light-emitting unit) of the electronic device such that an illumination state of the display unit (or the light-emitting unit) of the electronic device corresponds to the illumination state of the illumination unit 42A, in accordance with the received illumination control signal. In this way, the illumination states of the illumination units 42A, 42B and the illumination state of the display unit (or the light-emitting unit) of the electronic device may be associated with each other.

Also, regarding the method of determining the master vehicle and the slave vehicle, a vehicle that has first reached in the vicinity of the intersection point may be set as a master vehicle, and a vehicle that has later reached in the vicinity of the intersection point may be set as a slave vehicle.

A specific example of the method of determining the master vehicle and the slave vehicle is described.

First, the vehicle 1A that has reached in the vicinity of the intersection point outputs a beacon, which indicates that the vehicle 1A has reached in the vicinity of the intersection point, toward an outside. Then, when the vehicle 1A receives an ACK beacon to the beacon from the other vehicle, the vehicle 1A (the vehicle control unit 3A) determines that there is the other vehicle that has reached in the vicinity of the intersection point earlier than the vehicle 1A, and waits for a communication connection request from the other vehicle (in this way, the vehicle control unit 3A determines that the vehicle 1A is a slave vehicle). On the other hand, when the vehicle 1A does not receive an ACK beacon to the beacon, the vehicle 1A (the vehicle control unit 3A) determines that there is no other vehicle in the vicinity of the intersection point, and waits until the other vehicle appears in the vicinity of the intersection point (in this way, the vehicle control unit 3A determines that the vehicle 1A is a master vehicle). When the other vehicle (the vehicle 1B) appears in the vicinity of the intersection point, the vehicle 1A executes the series of processing shown in FIG. 5.

Also, after passing the intersection point, the vehicle 1A (master vehicle) may instruct the vehicle 1B, which has reached the intersection point later than the vehicle 1A, to be a master vehicle and then stop the transmission of the illumination control signal to the vehicle 1B.

Also, as another example of the method of determining the master vehicle and the slave vehicle, the traffic infrastructure equipment arranged in the vicinity of the intersection point may be used. For example, when the vehicle 1A reaches in the vicinity of the intersection point, the traffic infrastructure equipment detects the vehicle 1A. When the traffic infrastructure equipment determines that there is no vehicle except the vehicle 1A in the vicinity of the intersection point, the traffic infrastructure equipment transmits a signal, which indicates that the vehicle 1A is a master vehicle, to the vehicle 1A. On the other hand, when the traffic infrastructure equipment determines that there is a vehicle in the vicinity of the intersection point, in addition to the vehicle 1A, the traffic infrastructure equipment transmits a signal, which indicates that the vehicle 1A is a slave vehicle, to the vehicle 1A.

Also, after passing the intersection point, the vehicle 1A (master vehicle) may notify the traffic infrastructure equipment that the vehicle 1A has passed the intersection point, and then stop the transmission of the illumination control signal to the vehicle 1B. In the meantime, after passing the intersection point, the vehicle 1B (slave vehicle) may notify the traffic infrastructure equipment that the vehicle 1B has passed the intersection point.

According to the embodiment, it is possible to provide the illumination device 4B capable of presenting the information, which indicates that the vehicle 1A and the vehicle 1B are performing communication with each other, toward an outside such as a pedestrian P1, and the like. In other words, it is possible to visualize a state of inter-vehicle communication between the vehicles capable of traveling in the automatic driving mode by the illumination device 4B. For example, since the pedestrian P1 and the like can check safety of the vehicles 1A, 1B by seeing the information indicating that the vehicle 1B is performing communication with the vehicle 1A, the pedestrian can cross in relief a crosswalk and the like. Also, since a driver of the other vehicle (manual driving vehicle) can check safety of the vehicles 1A, 1B by seeing the information indicating that the vehicle 1A and the vehicle 1B are performing communication with each other, the driver can pass in relief the intersection point.

Also, since the illumination control unit 43B controls the illumination unit 42B to blink in synchronization with the illumination unit 42A, the pedestrian P1 can perceive that the vehicle 1B is performing communication with the vehicle 1A by seeing the situation where the illumination unit 42B is blinking in synchronization with the illumination unit 42A.

Also, since the illumination control unit 43B controls the illumination unit 42B such that the illumination color of the illumination units 42B corresponds to the illumination color of the illumination units 42A, the pedestrian P1 can perceive that the vehicle 1B is performing communication with the vehicle 1A by seeing the situation where the illumination color of the illumination unit 42B corresponds to the illumination color of the illumination unit 42A.

Also, when the vehicle 1B exists within the predetermined range from the vehicle 1A, the wireless communication unit 10B can receive the illumination control signal from the wireless communication unit 10A. Thus, the vehicle 1B existing within the predetermined range from the vehicle 1A can present the information, which indicates that the vehicle 1B is performing communication with the vehicle 1A, toward the pedestrian P1.

Also, when the vehicle 1A and the vehicle 1B exist in the vicinity of the intersection point, the wireless communication unit 10B may receive the illumination control signal from the wireless communication unit 10A. Thus, the vehicle 1B existing in the vicinity of the intersection point can present the information, which indicates that the vehicle 1B is performing communication with the vehicle 1A, toward the outside such as the pedestrian P1 and the like. For example, the pedestrian P1 in the vicinity of the intersection point can check the safety of the vehicles 1A, 1B by seeing the information and can cross in relief the crosswalk.

Also, when the illumination states of the illumination units 42A, 42B and the illumination state of the display unit (or the light-emitting unit) of the electronic device carried by the pedestrian P1 in the vicinity of the intersection point are associated, the pedestrian P1 can visually recognize that the vehicles 1A, 1B and the electronic device are performing communication with each other, and can clearly check the safety of the vehicles 1A, 1B.

<Illumination Control System 100 to be Implemented by Group of Vehicles G Traveling in Row Traveling Mode>

Figure 6:
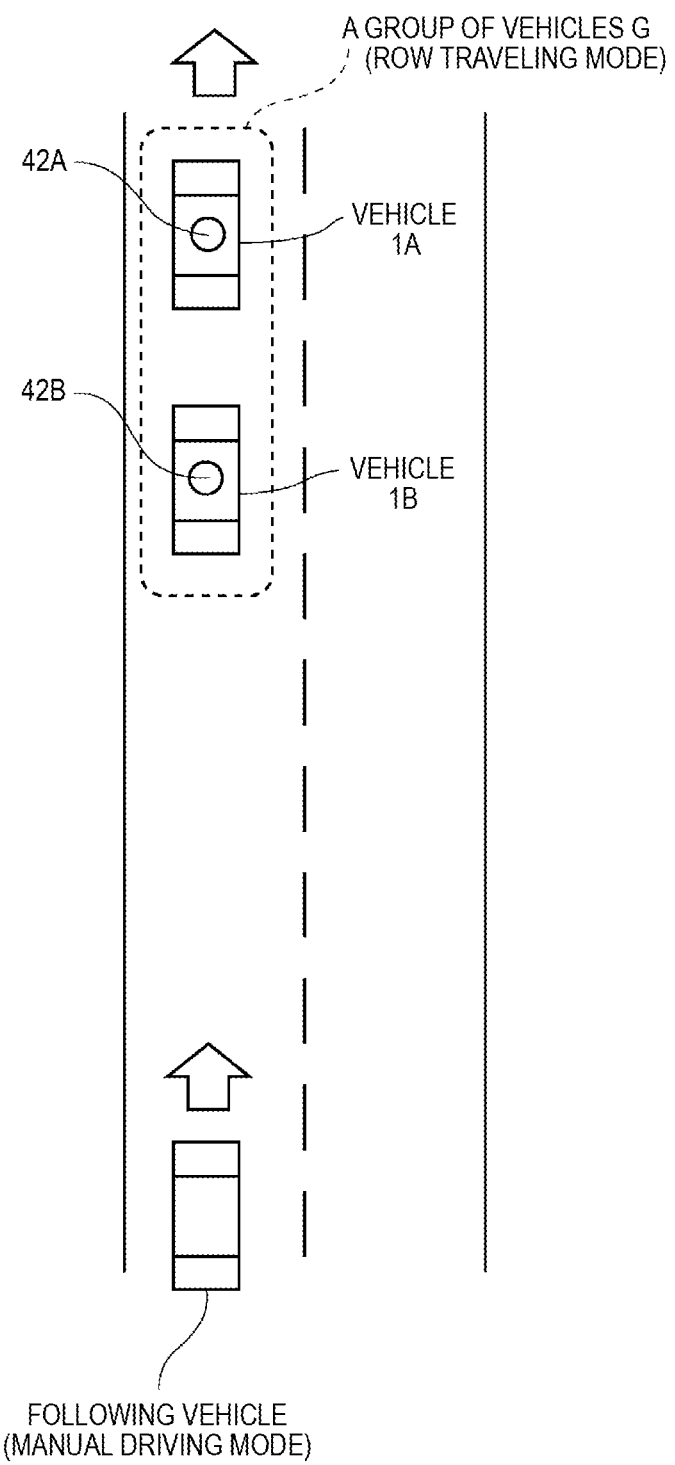
FIG. 6 illustrates a situation where an illumination state of the illumination unit of one vehicle belonging to a group of vehicles traveling in a row traveling mode and an illumination state of the illumination unit of the other vehicle correspond to each other.
Figure 7:
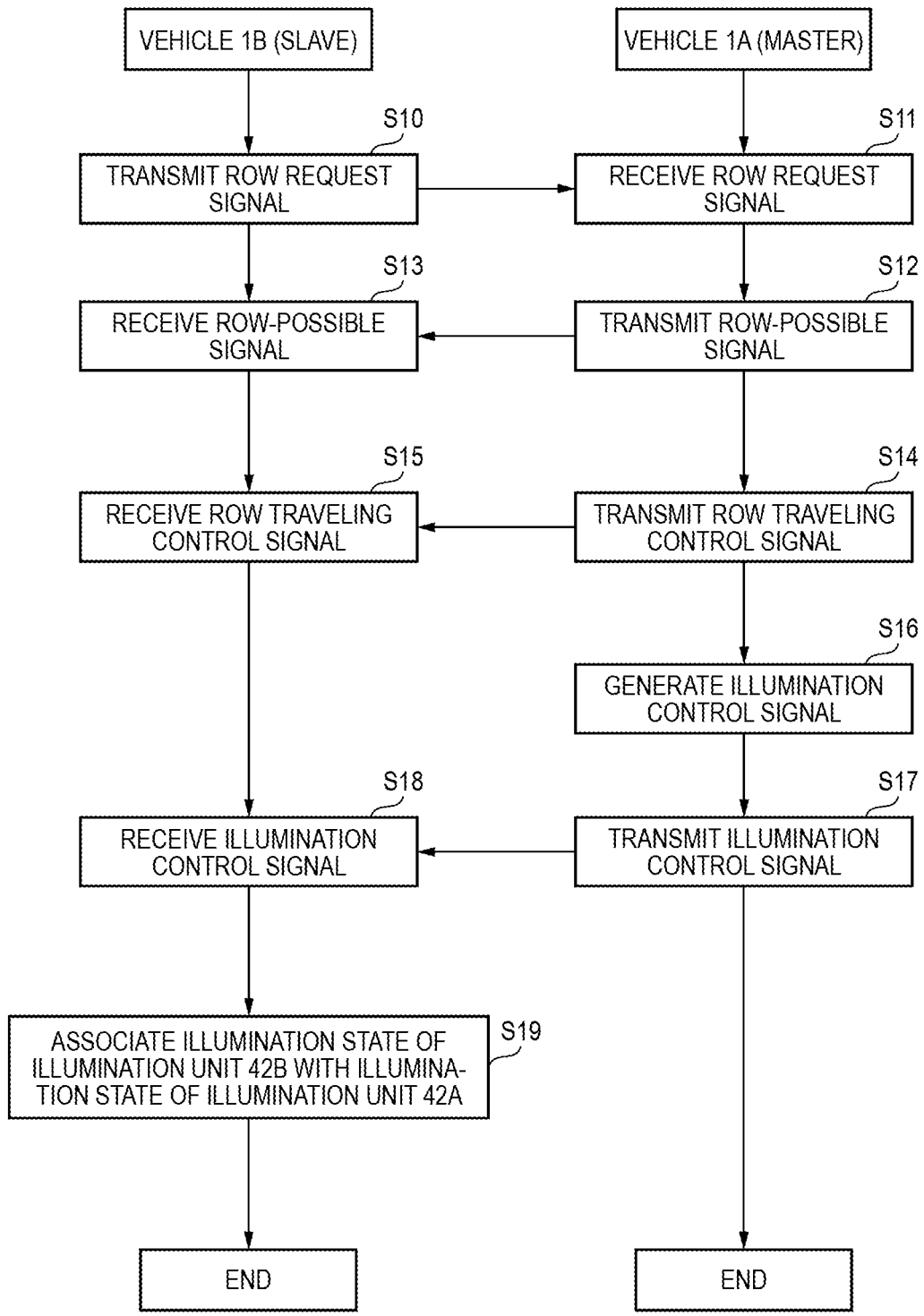
FIG. 7 is a sequence diagram for illustrating an example of an operation of an illumination control system that is implemented by a group of vehicles G traveling in the row traveling mode.

Subsequently, the illumination control system 100 in a group of vehicles G traveling in a row traveling mode is described with reference to FIGS. 3, 6 and 7. FIG. 6 illustrates a situation where an illumination state of the illumination unit 42A of the vehicle 1A belonging to a group of vehicles G traveling in a row traveling mode and an illumination state of the illumination unit 42B of the vehicle 1B correspond to each other. FIG. 7 is a sequence diagram for illustrating an example of an operation of the illumination control system 100 that is implemented by the group of vehicles G traveling in the row traveling mode.

Here, in the row traveling mode, a following vehicle executes the automatic traveling control, based on a row traveling control signal transmitted from a leading vehicle. In the meantime, the following vehicle may be configured to execute the automatic traveling control, based on only the row traveling control signal transmitted from the leading vehicle or may be configured to execute the automatic traveling control, based on the transmitted row traveling control signal, the surrounding environment information acquired by a camera and a radar of the following vehicle, and the like. In the group of vehicles G, a leading vehicle is a master vehicle, and a following vehicle except the leading vehicle is a slave vehicle. As shown in FIG. 6, the vehicle 1A is a leading vehicle of a group of vehicles G, and the vehicle 1B is a following vehicle of the group of vehicles G. The vehicle 1A may travel in the automatic driving mode or in the manual driving mode. In the meantime, the number of vehicles belonging to the group of vehicles G may be three or more.

As shown in FIG. 3, the vehicle control unit 3A of the vehicle 1A, which is the leading vehicle, generates a row traveling control signal. Then, the wireless communication unit 10A transmits the generated row traveling control signal to the vehicle 1B, in accordance with a command of the vehicle control unit 3A. The wireless communication unit 10B of the vehicle 1B, which is the following vehicle, receives the row traveling control signal, and then the vehicle control unit 3B automatically controls the traveling of the vehicle 1B, based on the row traveling control signal. Here, the vehicle 1A and the vehicle 1B may directly perform communication with each other in an ad hook mode.

Subsequently, the operations of the illumination control system 100 of this example are described with reference to FIG. 7.

First, in order to implement a row traveling in which the vehicle 1A is a leading vehicle, the vehicle 1B (the wireless communication unit 10B) transmits a row request signal to the vehicle 1A (the wireless communication unit 10A) (step S10). After the wireless communication unit 10A receives the row request signal (step S11), the vehicle control unit 3A determines whether it is possible to implement a row traveling in which the vehicle 1A is a leading vehicle. When the vehicle control unit 3A determines that it is possible to implement the row traveling, the wireless communication unit 10A transmits a row-possible signal to the vehicle 1B (step S12). After the wireless communication unit 10B receives the row-possible signal from the vehicle 1A (step S13), the vehicle control unit 3B may display notice information, which indicates that the driving mode of the vehicle 1B is a row traveling mode, on a display mounted to the vehicle 1B.

Then, after the vehicle control unit 3A generates a row traveling control signal, the wireless communication unit 10A transmits the generated row traveling control signal to the vehicle 1B (step S14). After the wireless communication unit 10B receives the row traveling control signal (step S15), the vehicle control unit 3B executes the automatic traveling control, based on the received row traveling control signal. Accordingly, the driving mode of the vehicle 1B becomes the row traveling mode.

Then, after the illumination control unit 43A generates an illumination control signal indicative of the illumination state of the illumination unit 42A (step S16), the wireless communication unit 10A transmits the illumination control signal to the vehicle 1B (step S17). After the wireless communication unit 10B receives the illumination control signal (step S18), the illumination control unit 43B controls the illumination unit 42B such that the illumination state of the illumination unit 42B corresponds to the illumination state of the illumination unit 42A, based on the illumination control signal (step S19). For example, the illumination control unit 43B may control the illumination unit 42B to blink in synchronization with the illumination unit 42A or may control the illumination unit 42B such that the illumination color of the illumination unit 42B corresponds to the illumination color of the illumination unit 42A. In this way, the series of illumination control processing is executed.

In the meantime, when the number of vehicles belonging to the group of vehicles G is three or more and the leading vehicle leaves the row, a following vehicle, which is traveling immediately after the leading vehicle, becomes a new leading vehicle (master vehicle), and may transmit the row traveling control signal and the illumination control signal to a following vehicle. Also, at a point of time at which the leading vehicle leaves the row, the leading vehicle may stop the transmission of the row traveling control signal and the illumination control signal to a following vehicle. In the meantime, when a following vehicle leaves the row, the following vehicle may notify the leading vehicle that the following vehicle leaves the row, and then the leading vehicle stops the transmission of the row traveling control signal and the illumination control signal to the following vehicle.

According to the embodiment, it is possible to provide the illumination control system 100 capable of presenting the information, which indicates that the leading vehicle and the following vehicle belonging to the group of vehicles G traveling in the row traveling mode are performing communication with each other, toward an outside such as a following vehicle (manual driving mode), a pedestrian P1 and the like. For example, since a driver of a following vehicle traveling in the manual driving mode behind the group of vehicles G can visually recognize that the group of vehicles G is traveling in the row traveling mode, the driver can overtake in relief the group of vehicles G.

Although the embodiment of the present invention has been described, it goes without saying that the technical scope of the present invention should not be interpreted limitedly by the description of the embodiment. It will be understood by one skilled in the art that the embodiment is just exemplary and that the embodiment can be diversely changed within the scope of the invention defined in the claims. The technical scope of the present invention should be determined based on the scope of the invention defined in the claims and its equivalent scope.

In the embodiment, the driving mode of the vehicle includes the full-automatic driving mode, the advanced driving support mode, the driving support mode, and the manual driving mode. However, the driving mode of the vehicle should not be limited to the four modes. The classification of the driving mode of the vehicle may be appropriately changed, in accordance with laws or rules relating to the automatic driving in each country. Likewise, the definitions of "the full-automatic driving mode", "the advanced driving support mode" and "the driving support mode" described in the embodiment are just examples, and can be appropriately changed, in accordance with laws or rules relating to the automatic driving in each country.

The subject application is based on Japanese Patent Application No. 2015-249882 filed on Dec. 22, 2015, the contents of which are incorporated herein by reference.

The invention claimed is:

1. A vehicle illumination device provided to a vehicle capable of traveling in an automatic driving mode, the vehicle illumination device comprising:
   a first illumination unit configured to irradiate light toward an outside of the vehicle; and
   a first illumination control unit configured to control the first illumination unit based on an illumination control signal transmitted from another vehicle capable of traveling in the automatic driving mode and including a second illumination unit, such that an illumination state of the first illumination unit is controlled to match an illumination state of the second illumination unit,
   wherein the first illumination control unit is configured to control the first illumination unit to change the first illumination unit such that an illumination color of the first illumination unit to match an illumination color of the second illumination unit in order to visually signal that the vehicle and the another vehicle are in communication with each other, and
   wherein the vehicle and the another vehicle are configured to determine which one of the vehicle and the another vehicle is a master vehicle to output an illumination control signal based on an order of the vehicle and the another vehicle arriving at a vicinity.

2. The vehicle illumination device according to claim 1, wherein the first illumination control unit is configured to control the first illumination unit to blink in synchronization with the second illumination unit.

3. A vehicle capable of traveling in an automatic driving mode, the vehicle comprising:
   the vehicle illumination device according to claim 1;
   a first wireless communication unit configured to receive the illumination control signal; and
   a vehicle control unit configured to control traveling of the vehicle.

4. An illumination control system comprising:
   a second vehicle capable of traveling in an automatic driving mode and including:
      a second illumination unit configured to irradiate light toward an outside;
      a second illumination control unit configured to control the second illumination unit;
      a control signal generation unit configured to generate an illumination control signal; and
      a second wireless communication unit configured to transmit the illumination control signal; and
   a first vehicle capable of traveling in the automatic driving mode and including:
      a first wireless communication unit configured to receive the illumination control signal;
      a first illumination unit configured to irradiate light toward the outside; and
      a first illumination control unit configured to control the first illumination unit based on the illumination control signal such that an illumination state of the first illumination unit is controlled to match an illumination state of the second illumination unit,
   wherein the first illumination control unit is configured to control the first illumination unit to change the first illumination unit such that an illumination color of the first illumination unit to match an illumination color of the second illumination unit in order to visually signal that the first vehicle and the second vehicle are in communication with each other, and
   wherein the first vehicle and the second vehicle are configured to determine which one of the first vehicle and the second vehicle is a master vehicle to output an illumination control signal based on a location of the first vehicle and the second vehicle traveling in a row.

5. The illumination control system according to claim 4, wherein when the first vehicle exists within a predetermined range from the second vehicle, the first wireless communication unit is able to receive an illumination control signal from the second wireless communication unit.

6. The illumination control system according to claim 4, wherein when the first vehicle and the second vehicle exist in the vicinity of an intersection point, the first wireless communication unit is able to receive the illumination control signal from the second wireless communication unit.

7. The illumination control system according to claim 6, wherein the second vehicle is a vehicle that appears in the vicinity of the intersection point temporally earlier than the first vehicle.

8. The illumination control system according to claim 4, wherein the first vehicle and the second vehicle belong to a group of vehicles traveling in a row traveling mode, and
    wherein the second vehicle is a leading vehicle of the group of vehicles and the first vehicle is a following vehicle of the group of vehicles.

\* \* \* \* \*